J. ELLIS.
GASOLENE FILTER.
APPLICATION FILED APR. 28, 1906.

898,567.

Patented Sept. 15, 1908.

Witnesses:
Ernest A. Telfer
William C. Flass

Inventor:
John Ellis
by his attorney
Charles S. Goodsey

UNITED STATES PATENT OFFICE.

JOHN ELLIS, OF LYNN, MASSACHUSETTS.

GASOLENE-FILTER.

No. 898,567.  Specification of Letters Patent.  Patented Sept. 15, 1908.

Application filed April 28, 1906. Serial No. 314,141.

*To all whom it may concern:*

Be it known that I, JOHN ELLIS, a citizen of the United States, residing at Lynn, in the county of Essex and State of Massachusetts, have invented new and useful Improvements in Gasolene-Filters, of which the following is a specification.

This invention relates to an improved filter and separator particularly adapted to be used in automobiles and power boats, or wherever gasolene is used as a motive power in connection with an engine.

The device is adapted to remove the impurities and sediment from gasolene and also to separate any water which may be contained in said gasolene therefrom.

The object of the invention is to provide a cheap, convenient and compact device for the purpose hereinbefore set forth which can readily be inserted in the pipe leading from the gasolene tank to the carbureter.

The invention consists in the combination and arrangement of parts set forth in the following specification and particularly pointed out in the claims thereof.

Figure 1:
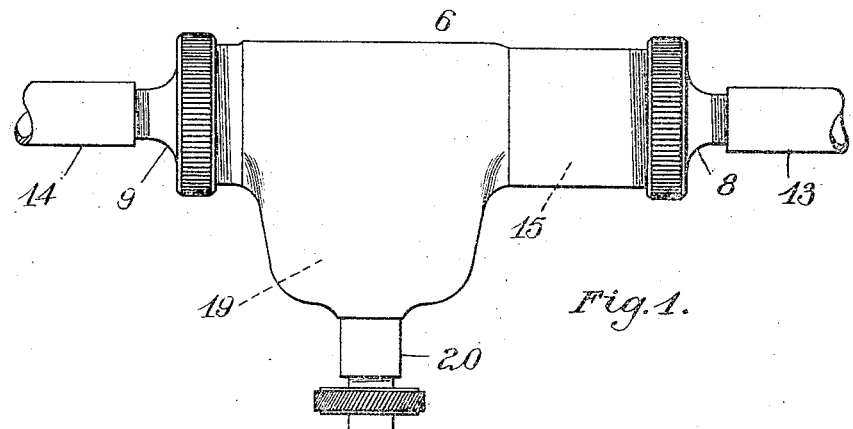
Figure 2:
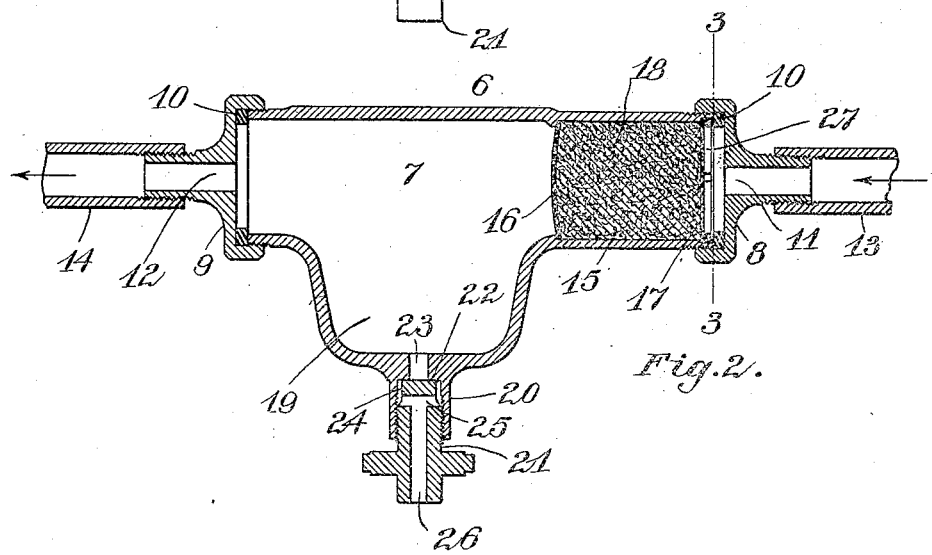
Figure 3:
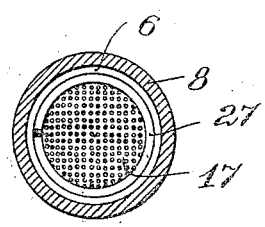
Figure 4:
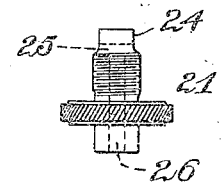

Referring to the drawings: Figure 1 is a side elevation of my improved filter and separator with a portion of the pipes which connect the filter with the tank and with the carbureter shown attached thereto and broken off to save space. Fig. 2 is a longitudinal central section, partly in elevation of said device. Fig. 3 is a section, partly in elevation, taken on line 3—3 of Fig. 2, looking toward the left in said figure. Fig. 4 is a side elevation of the plug or drip cock by means of which water is allowed to pass out of the water chamber.

Like numerals refer to like parts throughout the several views of the drawings.

In the drawings, 6 is a casing having a passageway 7 extending longitudinally therethrough with a cap 8 at one end thereof and a cap 9 at the other end thereof. The caps 8 and 9 have screw-threaded engagement with the casing 6 and the leakage of gasolene is prevented by means of gaskets or washers 10. The caps 8 and 9 each have a passage 11 and 12, respectively, extending therethrough constituting inlet and outlet orifices, respectively. The pipe 13 has screw-threaded engagement with the cap 8 and leads to the gasolene tank; the pipe 14 has screw-threaded engagement with the cap 9 and leads to the carbureter.

Adjacent to the inlet passage 11 is a filter chamber 15 located in the passageway 7, the filter consisting, preferably, of strainers 16 and 17 with a filtering substance 18 of any desirable material introduced between said strainers.

The filtering material 18 may be either quartz, carbon, charcoal, or washers of felt may be used as may be desired. Beneath the passageway 7 and between the filtering chamber 15 and the outlet orifice 12 is a precipitation chamber 19 which is of sufficiently greater area than the inlet and outlet passages, to afford, in a sense by retardation, an expansion or precipitation chamber, wherein, before passage of the gasolene through the outlet, the water carried thereby will settle or precipitate, the gasolene passing on through the outlet. A projection 20 is provided beneath this chamber 19 which is interiorly screw-threaded to engage a plug 21. The plug 21 constitutes a drip-cock or valve, its upper face bearing against a valve-seat 22 adjacent to a passage or port 23 leading downwardly from the interior of the precipitation chamber 19. The upper portion of the plug 21 is reduced in diameter at 24 and has a cross-passage 25 therein which connects with a vertical passage 26 leading downwardly and through the lower end of the plug 21.

The operation of the device hereinbefore specifically described is as follows: Gasolene passes through the pipe 13 from the gasolene tank and through the inlet passage or orifice 11 to the interior of the casing 6. Said gasolene passes through the strainer 17, then through the filtering material 18, and through the strainer 16. During this portion of its passage any impurities or sediment which may be contained therein are deposited upon the filtering material, and the gasolene thus filtered passes along through the passageway 7 and over the precipitation chamber 19. During this portion of its passage any water which may be contained in its natural state in said gasolene drops, because of its greater specific gravity, to the bottom of the chamber 19, while the gasolene floats in the upper portion of said chamber and in the passageway 7 until the chamber 19 has become filled with water, when it is drawn off by unscrewing to a slight extent the plug 21 and allowing the water to pass downwardly through the passage 23, around the reduced portion 24 of the plug 21 through the cross-passage 25 and downwardly through the outlet passage 26. The gasolene having thus become filtered and the water separated therefrom passes through the outlet orifice or passage 12 into the pipe 14 and is conducted by said pipe to the carbureter.

In a device of this character it is very essential that the filtering material should be capable of being readily cleansed and also capable of being readily removed and new filtering material introduced in its place. These ends are accomplished in the device hereinbefore described in the following manner: The impurities and sediment from the gasolene will be deposited in the filtering material and upon and immediately adjacent to the outer strainer 17, and to remove these impurities quickly and efficiently the device is detached from the pipes 13 and 14 and the cap 9 attached by a suitable fitting to a water faucet connected to a water supply under pressure. The water is then allowed to flow under pressure from the faucet through the filter and separator in the reverse direction to that indicated by the arrows in Fig. 2, whereupon substantially all of the impurities and sediment collected upon the filtering material and upon the strainer 17 will be washed therefrom outwardly through the passage 11 in the cap 8.

The supply of filtering material can readily be introduced in the filtering chamber 15 by removing the split spring 27 and the strainer 17 which is held in position by said spring, thus leaving the filter chamber open to remove any filtering material that may be contained therein, and after thus removing the old filtering material new filtering material is placed in the filter chamber and the strainer 17 with the spring 27 replaced, as shown in Fig. 2.

Having thus described my invention, what I claim and desire by Letters Patent to secure is:

1. A gasolene filter and separator comprising in its construction a casing provided with a passageway extending longitudinally therethrough and having an inlet and an outlet orifice, said casing provided with a filter chamber adjacent to said inlet orifice, there being a precipitation chamber located beneath said passageway between said filter and said outlet orifice.

2. A gasolene filter and separator comprising in its construction a casing provided with a passageway extending longitudinally therethrough having an inlet and an outlet orifice, said casing provided with a filter chamber adjacent to said inlet orifice, there being a precipitation chamber located beneath said passageway between said filter and said outlet orifice, and a drip-cock adapted to open and close a passage leading out of said precipitation chamber.

3. A gasolene filter and separator comprising in its construction a casing provided with a passageway extending therethrough, caps having screw-threaded engagement with said casing at opposite ends of said passageway, respectively, each of said caps having a hole extending therethrough into said passageway and constituting, respectively, an inlet and an outlet orifice therefor, filtering material located in said passageway adjacent to said inlet passage, there being a precipitation chamber located beneath said passageway between said filtering material and said outlet orifice, and a drip-cock connected to said precipitation chamber.

4. A gasolene filter and separator comprising in its construction a casing provided with a passageway extending therethrough, caps having screw-threaded engagement with said casing at opposite ends of said passageway, respectively, each of said caps having a hole extending therethrough into said passageway and constituting, respectively, an inlet and an outlet orifice therefor, two strainers located in said passageway adjacent to said inlet orifice and filtering material located in said passageway between said strainers, there being a precipitation chamber located beneath said passageway between said filtering material and said outlet orifice, and means whereby the precipitation in said chamber may be removed therefrom.

5. A gasolene filter and separator comprising in its construction a casing provided with a passageway extending longitudinally therethrough and having an inlet and an outlet orifice, said casing provided with a filter chamber adjacent to said inlet orifice, there being a precipitation chamber located beneath said passageway between said filter and said outlet orifice, said precipitation chamber having a passage leading out of the bottom thereof, and a plug having screw-threaded engagement with said casing, the upper end of said plug adapted to bear against a seat provided in said casing adjacent to said last named passage to close the same and having the periphery of its upper end of reduced diameter, whereby when said plug is moved away from contact with said seat the precipitation in said chamber may pass from said chamber along the reduced portion of said plug and out through a passage provided in said plug.

In testimony whereof I have hereunto set my hand in presence of two subscribing witnesses.

JOHN ELLIS.

Witnesses:
CHARLES S. GOODING,
ANNIE J. DAILEY.